United States Patent

Barrington

[15] 3,655,564
[45] Apr. 11, 1972

[54] WATER-REPELLANT THERMAL INSULATING COMPOSITION

[72] Inventor: Jonathan Barrington, Malvern, Pa.

[73] Assignee: Insul-Fil Manufacturing Company, Primos, Pa.

[22] Filed: May 9, 1968

[21] Appl. No.: 727,971

[52] U.S. Cl. ................................252/62, 61/72.1, 61/72.4, 138/105
[51] Int. Cl. ................................F16l 1/00, F16l 59/00
[58] Field of Search ..............252/62; 138/105; 61/72.1, 72.4

[56] References Cited

UNITED STATES PATENTS

| | | | |
|---|---|---|---|
| 2,625,512 | 1/1953 | Powell | 252/62 |
| 3,015,626 | 1/1962 | Kingsbury | 252/62 |
| 3,149,030 | 9/1964 | Lisle | 252/62 X |
| 3,166,511 | 1/1965 | Matsch et al. | 252/62 |
| 3,169,927 | 2/1965 | Matsch | 252/62 |
| 3,313,321 | 4/1967 | Keller | 138/105 |
| 3,418,399 | 12/1968 | Ziegler | 264/35 |
| 3,421,328 | 1/1969 | Oosterbaan | 61/72.1 |
| 3,445,253 | 5/1969 | Lee | 106/40 |
| 3,473,339 | 10/1969 | Schlafly | 61/72.1 |
| Re25,757 | 4/1965 | Morse | 264/35 |

Primary Examiner—Harold Ansher
Attorney—Synnestvedt & Lechner

[57] ABSTRACT

A mixture of hydrophobically coated expanded perlite particles of a particular size with particles of a particular and different size having a hydrophobic surface, which mixture functions as a water-repellant thermal insulation.

1 Claims, 2 Drawing Figures

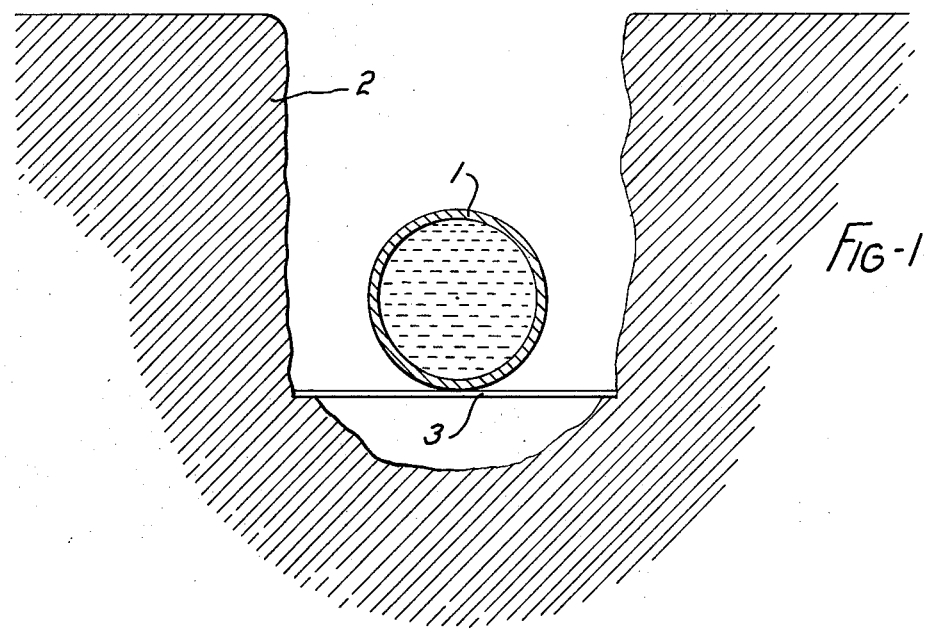
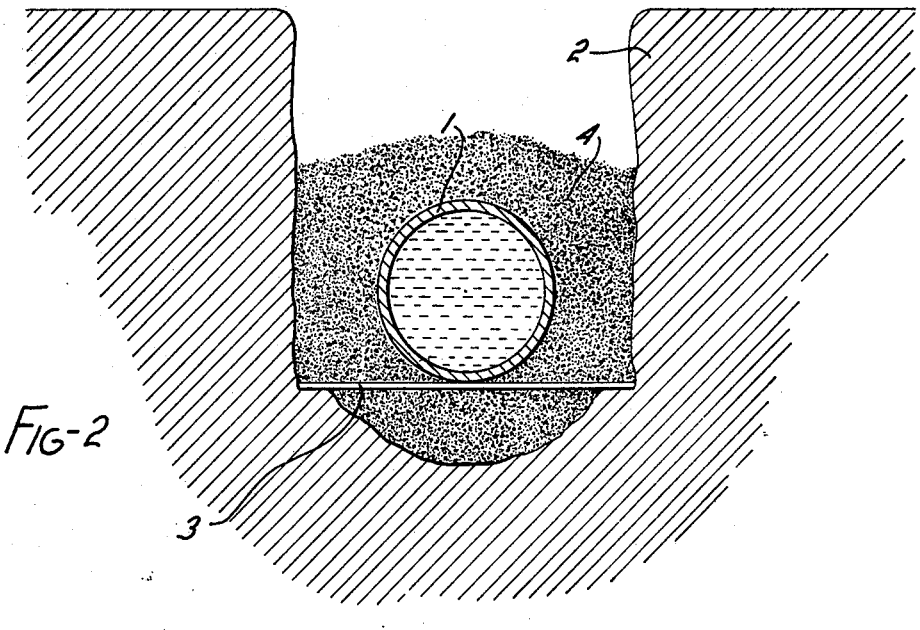

WATER-REPELLANT THERMAL INSULATING COMPOSITION

The subject invention relates to a water-repellant thermal insulation for an underground conduit.

When a conduit is buried underground, its life may be prolonged by shielding it from the moisture in the earth, thereby preventing, or at least retarding, corrosion of the surface of the conduit. When such a conduit is used to convey fluid—either a liquid or a gas—in most instances it is necessary thermally to insulate it in order to impede the transfer of heat to or from the fluid in the conduit.

These functions heretofore have been performed by surrounding the underground conduit with a mechanical mixture of expanded perlite particles coated and mixed with a hydrophobic substance, and then sintering part of this mixture by exposing it to a temperature of at least 180° F., usually by passing through the conduit a fluid having such a temperature.

However, the necessity of sintering this mixture presents a significant problem where the underground conduit is not to convey a fluid (for example, it is to house electrical conductors), or is to convey a fluid which will not reach a temperature sufficient to cause sintering (for example, it is to convey a fluid used in an air conditioning system).

It has been discovered that, by mixing together particles of hydrophobically coated expanded perlite of a particular size with particles of a particular but different size having a hydrophobic surface, the dual functions of thermal insulation and moisture shielding can be performed without the need to sinter the mixture.

An object of the subject invention is to provide a mechanical mixture of particles, including particles of expanded perlite, which, when placed around an underground conduit, will prevent or retard the flow of moisture toward the surface of that conduit and prevent or retard the transfer of heat to or from a fluid in the conduit, and which does not have to be sintered to perform these functions.

Another object of the subject invention is to provide an improved loose-fill insulation.

Another object of the subject invention is to provide an improved method for shielding from moisture and thermally insulating an underground conduit.

Another object of the subject invention is to provide an improved combination of a water-repellant thermal insulation and an underground conduit.

Other objects and a fuller understanding of the invention may be had by referring to the following description and claims, taken in conjunction with the accompanying drawing in which FIG. 1 is a cross-sectional view of a conduit placed underground in a ditch; and FIG. 2 is a cross-sectional view similar to that in FIG. 1 in which a water-repellant thermal insulation according to the subject invention surrounds the conduit.

The preferred form of the subject invention is a mechanical mixture of two sizes of particles: (1) particles of a size that between 90 and 100 percent of them are retained on a Tyler Standard Sieve No. 100 and between 70 and 90 percent of them pass through a Tyler Standard Sieve No. 8. These particles furthermore are of a size that substantially all will pass through a Tyler Standard Sieve No. 3; and substantially none will pass through a Tyler Standard Sieve No. 100; and 75 percent will pass through a Tyler Standard Sieve No. 8 but that 75 percent will not pass through a Tyler Standard Sieve No. 50. Particles of this size make up 50 percent by volume of this mixture, but may make up 25 to 75 percent by volume, depending upon considerations treated hereinafter; and (2) particles of a size that between 80 and 100 percent of them are retained on a Tyler Standard Sieve No. 200 and between 80 and 100 percent of them pass through a Tyler Standard Sieve No. 20. These particles furthermore are of a size that substantially all will pass through a Tyler Standard Sieve No. 20 and substantially none will pass through a Tyler Standard Sieve No. 200 and about 60 percent will pass through a Tyler Standard Sieve No. 30 but that 60 percent will not pass through a Tyler Standard Sieve No. 100.

It has been determined that, if carefully sized particles are not used, moisture will percolate between the interstices of adjacent particles. Thus, the mixture without further processing does not provide an effective moisture barrier.

The larger particles of this mixture numbered 1 above, are expanded perlite coated with a high softening point petroleum asphalt hydrocarbon, a by-product of the refinement of petroleum asphalt (solvent precipitated asphalt resin).

Perlite is a naturally occurring volcanic rock or glass. The perlite mined near NoAqua, New Mexico, is especially suitable in the utilization of the subject invention, although that mined in Caselton or Lovelock, Nevada; Florence, Colorado; or Sicorro or Grants, New Mexico, may be used. The perlite ore is crushed into small particles and graded. It then is expanded by quick heating in a suitable furnace to about 1,500° to 2,100° F. By this heating, the perlite particles are expanded 10 to 30 times their original volume. These particles, which appear like pearls or glass beads, contain a mass of air cells or voids which not only make them relatively light in weight, but also impart to them superior insulative properties. The bulk density of these expanded perlite particles preferably is between 5 and 15 lbs. per cubic ft. However, if superior thermal insulative properties of the finished product are not primary, and thus a low bulk density as well, a bulk density of up to 25 lbs. per cubic ft. is permissible.

As previously stated, the expanded perlite, which has superior thermal insulative properties, is coated with a high softening point petroleum asphalt hydrocarbon. This is done because the expanded perlite is not impervious to moisture. The asphalt coating used in the preferred form of the subject invention is a by-product of the refinement of petroleum asphalt (solvent precipitated asphalt resin). Representative physical properties of this asphalt are:

| | |
|---|---|
| Specific gravity at 60° F | 1.07–1.10 |
| Softening point, in Fahrenheit degrees | 280°–300° |
| Bitumen soluble in CCl₄ | 990 |
| Color (O.D.) | 373,000 |
| Acid value | 0.4 |
| Saponification number | 11.3 |

It should be understood that, although particular asphalt is described herein, any asphalt may be used. Furthermore, any substance which is hydrophobic is suitable as a coating for the expanded perlite.

In coating the expanded perlite with asphalt, the asphalt may be crushed to the form of dust. As the expanded perlite leaves the furnace where it was expanded, it is allowed to cool to between 600° and 1,400° F., preferably to between 600° and 800° F. When it reaches this temperature range, the asphalt in dust form is blended into it. The asphalt dust, upon contact with the expanded perlite particles, becomes vaporous, and flows over the particles. Upon cooling, the vaporous asphalt solidifies and forms a coating for the expanded perlite particles. The asphalt coating may also be sprayed on the surface of the expanded perlite.

The smaller particles of this mixture, numbered 2 heretofore, are made of the same asphalt as that which is used to coat the particles numbered 1. However, any asphalt may be used. Also, it should be understood, however, that these smaller particles may be expanded perlite of the kind used in the particles numbered 1, coated with a hydrophobic coating, such as the asphalt used to coat the particles numbered 1, or any other hydrophobic coating. Using the same hydrophobic coating tends to avoid compatibility problems and also tends to reduce manufacturing costs.

As previously set forth, in the preferred form the expanded perlite particles coated with asphalt make up 50 percent by volume of the mixture, but the portion of these particles may be varied between 25 and 75 percent while still accomplishing the objects of the invention. The particular use of the mixture many times will determine the appropriate portion. The percent by volume of coated expanded perlite particles is related to the importance of thermal insulation in a particular application, and should be increased as the importance of thermal insulation increases.

Referring now to FIG. 1, an underground conduit 1 generally is placed in a ditch 2 dug for that purpose. The conduit is shown resting on a support 3. The ditch 2 is not lined with concrete, but in many applications is so lined. A loose-fill, water-repellant insulation according to the subject invention 4 (FIG. 2) is placed around the periphery of the conduit 1 within the ditch 2. The thickness of the layer used depends principally upon the temperature to be maintained in the conduit. The mixture is then tamped. The nature of the mixture, as well as the tamping, creates an interlock of the interstices between adjacent particles and thereby prevents, or at least significantly retards, percolation of moisture around the several particles of the mixture. This in turn protects the outer surface of the conduit from exposure to moisture emanating from the surrounding earth, thereby preventing or retarding corrosion. And, the presence of the expanded perlite particles effectively thermally insulates the conduit.

That such a result occurs was proved by the following test: A plurality of holes were made in the lower portion of the side of a cylindrical container, near where the side was joined to the bottom of the container. A mixture of the preferred form of the subject invention, as described heretofore, was placed in this container. After tamping this mixture, a layer of approximately one inch was formed, resting on the bottom of the container. Three inches of water then was placed onto this layer. After one day in this condition, there was no evidence of any moisture penetration of the tamped layer, let alone any discharge of water through the holes formed at the lower portion of the container. After five days in this condition, there still was no evidence of moisture penetration of the tamped layer or of discharge through the holes in the container.

On the other hand, a similar test was conducted on a prior-art mixture of equal volumes of asphalt-coated expanded perlite particles and asphalt in flake form, some of these flakes being up to one-fourth inch across. Substantially immediately upon inserting the water onto the layer of tamped mixture, water was discharged out of the holes at the bottom of the container.

What is claimed is:

1. A water-repellant, thermal insulating composition comprising a mixture of particles of expanded perlite having an asphalt coating thereon and asphalt particles, wherein the said coated expanded perlite particles are of a size such that between 90 and 100 percent of said particles are retained on a Tyler Standard Sieve No. 100 and between 70 and 90 percent of said particles pass through a Tyler Standard Sieve No. 8, and said asphalt particles are of a size such that between 80 and 100 percent are retained on a Tyler Standard Sieve No. 200 and between 80 and 100 percent of said particles pass through a Tyler Standard Sieve No. 20, and wherein the said coated expanded perlite particles are from about 25 percent to about 75 percent by volume of said mixture.

* * * * *